United States Patent [19]

Hashimoto et al.

[11] Patent Number: 4,492,988
[45] Date of Patent: Jan. 8, 1985

[54] DROPOUT COMPENSATION SYSTEM

[75] Inventors: Kiyokazu Hashimoto, Matsubara; Keizi Hayashi, Ibaraki, all of Japan

[73] Assignee: Matsushita Electric Industrial Co., Ltd., Osaka, Japan

[21] Appl. No.: 411,265

[22] Filed: Aug. 25, 1982

[30] Foreign Application Priority Data

Aug. 27, 1981 [JP] Japan .................. 56-134587

[51] Int. Cl.³ ............................................. H04N 5/76
[52] U.S. Cl. ................................................. 358/336
[58] Field of Search ............ 360/38.1, 336, 314, 360/340

[56] References Cited

U.S. PATENT DOCUMENTS 4,085,426 4/1978 Aigrain et al. ............... 358/336

Primary Examiner—Robert L. Richardson
Attorney, Agent, or Firm—Stevens, Davis, Miller & Mosher

[57] ABSTRACT

A dropout compensation system used with a video tape recorder, video disc, etc. is disclosed. In conventional modulation systems, a reproduced signal which has been modulated in a modulation system in which the signal information is determined by the zero passage of the carrier, is delayed in the form of the modulated signal, and if a dropout occurs, the reproduced signal is switched to the delayed signal by a first switch thereby to compensate for the dropout. The phase of the modulated signal becomes discontinuous each time the switch is operated, thus causing an offensive spark-like interference upon demodulation. The invention is intended for reducing these noises and comprises a second demodulator for normally demodulating the delayed signal and a second switch operated at a different timing from the first switch in response to the dropout. The noise is extracted by the operation of the second switch and the extracted noise is cancelled by being combined at opposite polarity with the demodulated reproduced signal, which signal contains the noise but has been compensated for the dropout. A noise-removing circuit utilizing the horizontal correlation of the TV signal may be easily added to the configuration of the present invention.

7 Claims, 6 Drawing Figures

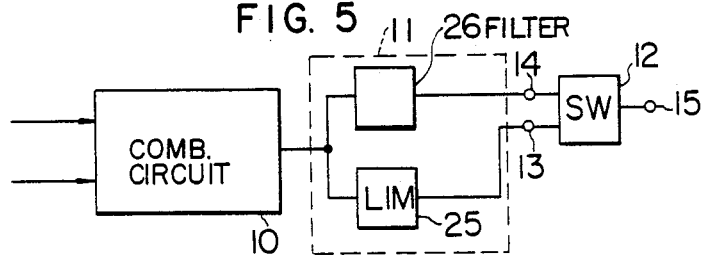
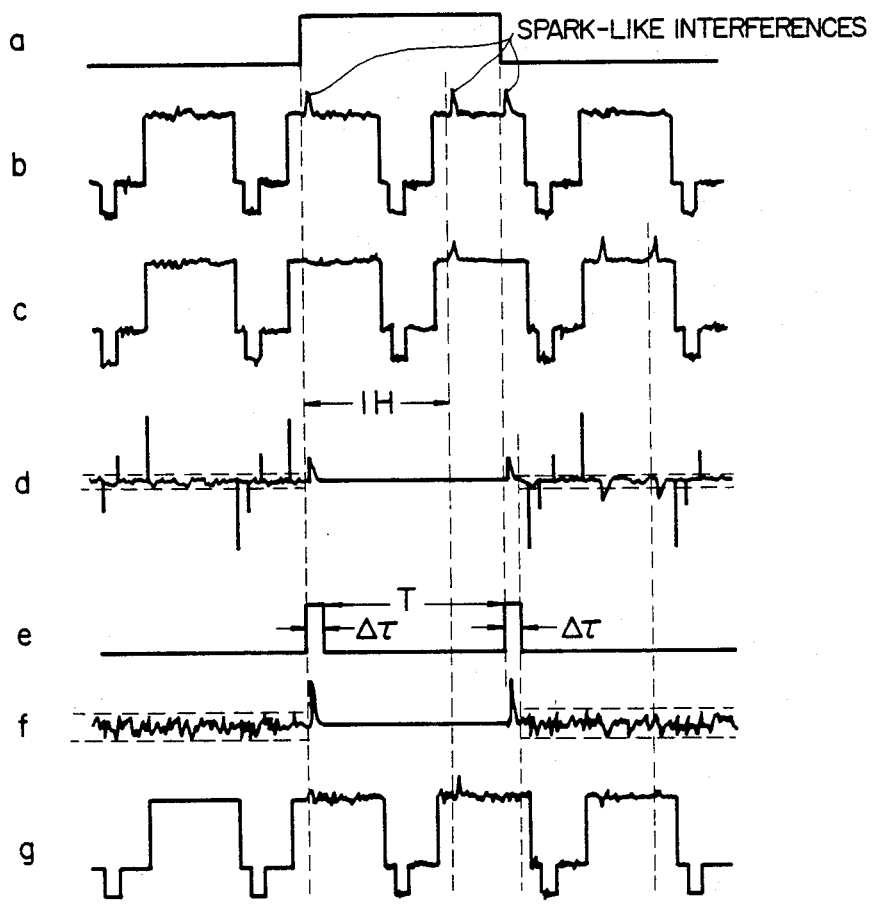

DROPOUT COMPENSATION SYSTEM

The present invention relates to a dropout compensation system for video tape recorders and video discs.

Conventional dropout compensation systems are classified into three types. In the system of a first type, a reproduced signal picked up from a recording medium such as a tape or a disc is passed through a delay line in which the reproduced signal has the carrier wave modulated with a TV signal. And the signals before passing through and after passing through the delay line are changed over by an electronic switch thereby to compensate for the dropout. In this way, the dropout is compensated for before the reproduced signal is demodulated in the form in which the carrier wave has been modulated with the TV signal, and subsequently the demodulation is carried out to produce the TV signal of which the dropout has been compensated for. The system of a second type is that the signals before and after the delay line are demodulated and changed over by an electronic switch thereby to produce a TV signal of which the dropout has been compensated for. In the system of a third type, the reproduced signal taken out of the recording medium, after being demodulated, is modulated again by a modulation system (such as an amplitude modulation system) in which the signal information is not determined by the passage of the carrier at the zero point, and the modulated signal, after being subjected to dropout compensation, is demodulated again to a TV signal thereby to produce the TV signal of which the dropout has been compensated for.

In the conventional system of the first type, if the reproduced signal obtained from the recording medium is in a form which has been modulated by a modulation system in which the signal information is determined by the passage of the carrier at the zero point as in the frequency or phase modulation, and where the carrier wave modulated by the TV signal is passed through the delay line so that the signals before and after the delay line are changed over by an electronic switch, an abrupt phase shift occurs at this moment of change over, with the result that the TV signal obtained by demodulation is accompanied by a bright or dark spark-like interference in accordance with the phase difference. This interference occurs at the instant when the electronic switch is operated upon detection of a dropout and at the instant when the electronic switch is returned to the original state after completion of the detection of the dropout. Further, the system of the first type has the disadvantage in that if the system is designed to compensate for the dropout even in the case where the input to the delay line is coupled to the output of the electronic switch and the dropout is longer than the delay time of the delay line, spark-like interferences occur a number of times repeatedly from the moment of the dropout detection to the end of the dropout at regular intervals of integral multiples of the delay time of the delay line.

The systems of the second and third types are effective to avoid this disadvantage. The system of the second type, however, as compared with the system of the first type, additionally includes a second demodulator circuit and a second electronic switch. If the form of modulation of the carrier is an FM modulation, the second demodulator circuit requires a limiter, an FM demodulator and a demodulation low-pass filter, so that the whole circuit is complicated even if the limiter and FM demodulator are formed by integrated circuits. Another disadvantage of the second-type system is that the two demodulation signals applied to the electronic switch are TV signals having the brightness information at a DC level, and in order to prevent the change of the luminance of the TV signal upon operation of the electronic switch, the two demodulation signals are required to be supplied to the electronic switch at the same DC voltage and AC voltage levels. The DC signal level and the AC signal level of the output signals of the two demodulators are required to be adjusted accurately and independently of each other. For attaining the coincidence of the two DC voltage levels accurately, it is not appropriate to utilize the average level of the TV signal which is varied by the luminance of the video signal, and therefore a clamp circuit is generally employed for maintaining a constant DC level of the pedestal or the synchronizing signal of the TV signal. In this conventional system, the spark-like interferences are completely eliminated which might occur at the instant when the electronic switch is operated upon detection of the dropout and at the instant when the electronic switch is returned to the original state after completion of the detection of the dropout.

In the conventional system of the third type, the signal that is passed through the delay line is modulated by a modulation system in which the signal information is not determined by the passage of the carrier at the zero point, and therefore even if the signal is changed over by the electronic switch, the spark-like interference does not occur. The system of the third type is superior in performance both to the systems of the first and second types. This system of the third type, however, additionary requires a modulator and a demodulator, and further the delay line is required to have a wide frequency-band characteristic at high frequencies since the delay line is for passing a signal whose information is not determined by the passage of the carrier at the zero point, thereby resulting in a most complicated and expensive system as compared with the systems of the first and second types.

The object of the present invention is to provide a dropout compensation system including means for removing the spark-like interference which occurs in the conventional dropout compensation system of the first type described above.

The dropout compensation system according to the present invention is substantially equivalent to the conventional system of the second type in performance and cost, however, the setting of an AC signal level and a DC signal level is facilitated and it is easy to incorporate a noise-removing circuit utilizing the horizontal correlation of the TV signal, in combination with the noise-removing circuit the total cost can be reduced.

The above and other objects, features and advantages will be made apparent by the detailed description taken in conjunction with the accompanying drawings, in which:

FIG. 5 is a diagram showing a modification of the embodiment of FIG. 4 additionally comprising limiter means in the coupling means in FIG. 2; and FIG. 6, consisting of a-g, shows waveforms for explaining the operation of the present invention.

Figure 1:
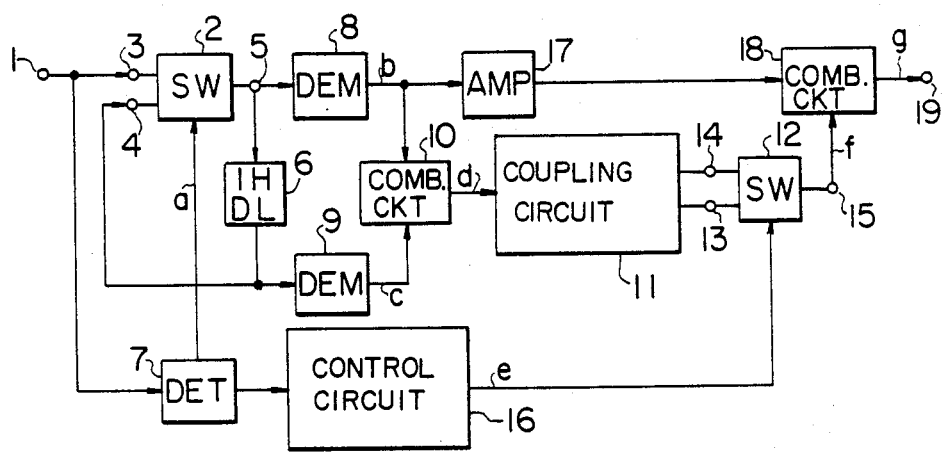
FIG. 1 is a block diagram showing a dropout compensation system according to an embodiment of the present invention.

In FIG. 1 showing an embodiment of the present invention, reference numeral 1 designates an input terminal for a signal reproduced from a recording medium by a magnetic head or the like and compensated for in the amplification or frequency characteristic as required. Numeral 2 designates a first electronic switch having a pair of input terminals 3 and 4 and an output terminal 5. Numeral 6 designates a delay circuit for delaying a signal for a predetermined length of time corresponding to one horizontal scanning period of the TV signal. Numeral 7 designates a detector circuit for detecting a dropout period in the signal reproduced from the recording medium and for generating a first control signal for controlling the electronic switch 2 by a detection output. One input terminal 3 of the electronic switch 2 is econnected to the input terminal 1 for the reproduced signal, and the delay circuit 6 is inserted between the output terminal 5 of the electronic switch 2 and the other input terminal 4 thereof. The electronic switch 2 is controlled by the output of the detector circuit 7 in such a manner as to output the input signal of the input terminal 3 at the output terminal 5 when the dropout does not occur, and to output the input signal of the input terminal 4 at the output terminal 5 when the dropout occurs. Numeral 8 designates a first demodulator for demodulating the output signal of the first electronic switch 2 into a TV signal, numeral 9 a second demodulator for demodulating the output signal of the delay circuit 6, numeral 10 a first combining circuit for extracting a difference component of the TV signals demodulated in the first and second demodulators 8 and 9, numeral 11 a coupling circuit for coupling the first combining circuit 10 having a predetermined transmission characteristic with the next stage, numeral 12 a second electronic switch having a pair of input terminals 13 and 14 and an output terminal 15, and numeral 16 a control circuit connected to the output terminal of the dropout detector circuit 7 for generating a second control signal for a predetermined length of time at least each time from the beginning and the end of the dropout as represented by the first control signal. Numeral 17 designates an amplifier, and numeral 18 a second combining circuit for subtracting the output signal of the second electronic switch 12 from the output signal of the amplifier 17. A TV signal compensated for the dropout is produced at the output terminal of the first demodulator 8. At the output terminal of the second demodulator 9, on the other hand, if the dropout does not occur, a demodulated signal of the output signal of the first electronic switch 2, namely, the reproduced signal supplied to the input terminal 1 and delayed by the delay time of the delay circuit 6 is produced. Conversely, if the dropout occurs, the input terminal 4 and the output terminal 5 of the first electronic switch 2 are connected to each other, and therefore a signal identical to the output of the first demodulator 8 is produced from the second demodulator 9. As a result, in the case where the delay time of the delay circuit 6 corresponds to one horizontal scanning period of the TV signal, if the dropout does not take place, the first combining circuit 10 produces a combined demodulated TV signal in which, with respect to one horizontal scanning period interval, signals of the same phase are subtracted and signals of different phases are added. In other words, the horizontal sync signal, pedestal portion, and signals having equal luminance with one horizontal scanning period interval are completely cancelled out, and only those signals having different luminances with one horizontal scanning period interval are outputted. In the presence of the droupout, on the other hand the outputs of the first and second demodulators 8 and 9 are equal to each other, and therefore no output is produced from the first combining circuit 10. The output of the combining circuit 10 thus takes the form of an AC signal substantially containing no DC component of the TV signal. Consider the instant when the input terminal to be connected with the output terminal 5 of the first electronic switch 2 is changed from 3 to 4 or from 4 to 3 in the beginning or end of the dropout. Also assume that the reproduced signal applied to the input terminal 1 has been modulated in a modulation system in which the signal information is determined by the passage of the carrier wave at the zero point as in the frequency or phase modulation. The instant the electronic switch 2 is changed over, a phase shift occurs abruptly which appears as a bright or dark spark-like interference in the TV signal. Althoug a signal compensated for the dropout is produced at the output terminal of the first demodulator 8, this signal contains the spark-like interference.

The present invention is intended to effectively remove the spark-like interference. In view of the fact that the output signal of the second demodulator 9 is a signal demodulated from a signal obtained by delaying the signal of the output terminal 5 of the first electronic switch 2 by one horizontal scanning period, the spark-like interference occurs in the output of the second demodulator 9 one horizontal scanning period after changing over the first electronic switch 2. In other words, in the beginning or end of the dropout, the spark-like interference occurs in the output of the first demodulator 8 but not in the output of the second demodulator 9. Thus the spark-like interferences occur in the output of the first combining circuit 10 in the beginning and end of the dropout. The second electronic switch 12, which is for extracting this spark-like interference component, has an output terminal 15 which is connected to the input terminal 13 which is substantially shut off from the spark-like interference component by the coupling circuit 11 in the absence of the dropout, and is connected to the input terminal 14 which is supplied with the spark-like interference by the coupling circuit 11 in the presence of the dropout. The electronic switch 12 is required to be so constructed that by the changing-over operation thereof, the passage or cut-off of the AC signal input alone is selected and the variation of average voltage is as small as less than the tolerance of about 1% of the TV signal level. Since the spark-like interference applied to the input terminal 14 of the second electronic switch 12 has passed through the first demodulator 8 having a limited band width and having a certain delay time, the spark-like interference has been delayed for the certain delay time from the instant of the changing over of the first electronic switch 2. For a longer time than this certain delay time, a second control signal is designed to continue to exist from the instant the first control signal changes or the instant of the occurrence or the termination of the dropout. Before the spark-like interference arrives at the input terminal 14 of the second electronic switch 12, the output terminal 15 is switched from the input terminal 13 to the input terminal 14 thereby to produce the second control signal for a longer time than the delay time of the first demodulator 8. After the arrival of the spark-like interference at the input terminal 14 of the second electronic switch 12, the output terminal 15 is switched from a connecting point to the input terminal 14 to the other connecting point to the input terminal 13. The spark-like interferences at the instant of occurrence and at the termination of the dropout are thus taken out at the output terminal 15 of the second electronic switch 12. During the period when the first control signal is generated, the first combining circuit 10 fails to produce an output, and therefore, regardless of the position of the second electronic switch 12 the output signal thereof remains unchanged. In view of this, the second control signal may continue to be produced from the occurrence of the dropout until the expiration of the above-mentioned predetermined time after the termination of the dropout.

The amplifier 17 functions in such a way that the spark-like interference component contained in the TV signal produced from the first demodulator 8 is rendered equal in magnitude and timing to the spark-like interference component taken out through the first combining circuit 10, coupling circuit 11 and second electronic switch 12, thereby to completely cancel out the spark-like interference component at the second combining circuit 18. As a result of the operation of this amplifier 17 which is not an essential part of the present invention, the dropout is compensated for at the output terminal 19 of the second combining circuit 18, thereby producing a TV signal from which the spark-like interferences at the time of occurence and termination of the dropout are removed.

Figure 2:
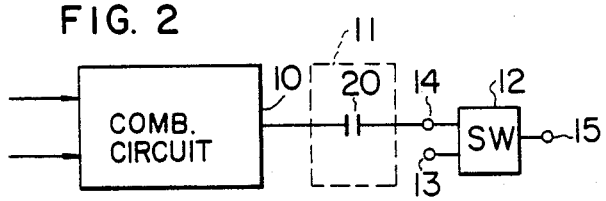
FIG. 2 shows a specific embodiment of the coupling means included in FIG. 1.
Figure 3:
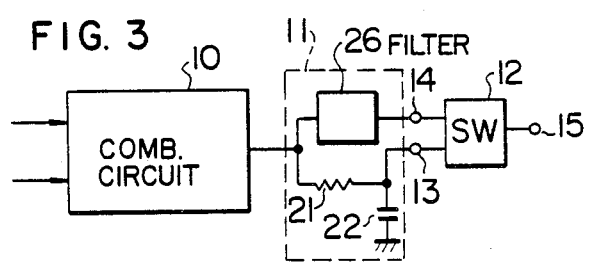
FIG. 3 is a diagram showing a modification of the coupling means shown in FIG. 2.

Reference is now made to FIGS. 2 and 3 for explaining examples of the coupling circuit 11 of which the average potential at the output terminal 15 does not substantially change when the second electronic switch 12 is changed over by the second control signal. In FIG. 2. the output of the first combining circuit 10 is coupled to the input terminal 14 of the second electronic switch 12 by a capacitor 20 which shuts off the DC component. In this case, the input terminals 13 and 14 of the second electronic switch 12 are supplied with an appropriate bias within the circuit thereof, and therefore a change of average potential of the output terminal 15 upon the changing over of the electronic switch 12 is determined solely by component elements of the electronic switch 12. An example wherein the bias for the input terminals 13 and 14 of the second electronic switch 12 is given from the first combining circuit 10 is shown in FIG. 3. In this example, the output terminal of the first combining circuit 10 and the input terminal 14 of the second electronic switch 12 are coupled via a filter 26 which permits at least the transmission of direct current and the spark-like interference, while the output terminal of the first combining circuit 10 is coupled to the input terminal 13 through a low-pass filter including a resistor 21 and a capacitor 22 to permit the transmission of a DC component alone. The filter 26 may pass a whole band or a predetermined band.

Figure 4:
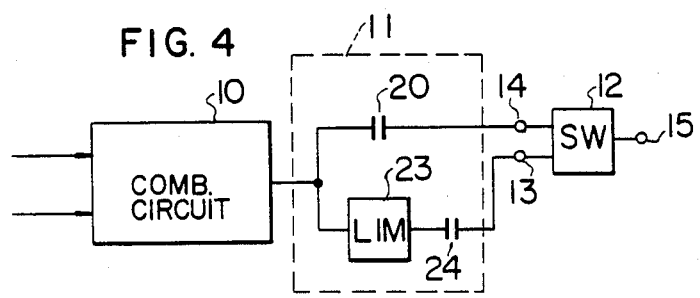
FIG. 4 is a diagram showing an example of the dropout compensation system according to the present invention in which a noise-removing function is added by providing a limiter to the coupling means in FIG. 2.

Also, the circuit configuration of the present invention greatly facilitates the addition of a noise-removing circuit for the reproduced signal, for example, as disclosed in Japanese Patent Lay-Open Publication No. 53-155629 (1978) at the time of reproduction of a TV signal, as shown by examples of FIGS. 4 and 5 which are realized by adding a limiter circuit to the coupling circuit described above. FIG. 4 shows the case in which a limiter circuit 23 is added to the example of the coupling circuit shown in FIG. 2. In response to a minute input signal level, the limiter circuit 23 produces a linear input-output characteristic, so that it acts as a clip circuit in response to an input signal having an amplitude larger than a predetermined level. A capacitor 24 is for cutting off a DC output voltage of the limiter circuit 23 thereby to determine the DC potential of the input terminals 13 and 14 only by the internal bias potential. FIG. 5 shows the case in which a limiter circuit 25 is added to the example of the coupling circuit shown in FIG. 3, in which case the limiter circuit 25 accurately transmits the DC output potential of the first combining circuit 10 and is required to contain a circuit having a function as a filter including the resistor 21 and the capacitor 22 in FIG. 3. Incidentally, the gain of the minute signal determined by the first combining circuit 10, limiter circuit 23 or 25 and second electronic switch 12 is approximately one half of the gain of the amplifier 17. This value may be changed properly, although the noise-removing effect also changes. In this circuit system, when the dropout interference does not occur, two signals with one horizontal scanning period interval obtained respectively from the first demodulator 8, and the delay circuit 6 and second demodulator 9 are compared with each other in the first combining circuit 10 thereby to take out a signal component of opposite phase, which if more than a predetermined level in amplitude, is reduced to a predetermined amplitude at the amplitude limiter circuit 23 or 25. In this way, the output signal of the first demodulator circuit 8 introduced to the output terminal 19 through the second combining circuit 18 is such that the minute signal obtained from the first combining circuit 10 is substantially completely cancelled, and if the minute signal exceeds a predetermined level, then only a predetermined amplitude is cancelled. In other words, this circuit configuration is such that the TV signal is delayed for one horizontal scanning period, and the delayed signal is added to the other TV signal not delayed at an equal level, thereby forming what is called the comb filter, whose filtering effect improves the S/N ratio of the minute signal. Since the signal having an amplitude exceeding a predetermined level is limited in amplitude by the amplitude limiter circuit, undesired regular noises occurred at the time of reproduction of the color TV signal is efficiently removed without substantially deteriorating the resolution in vertical direction.

FIG. 6 shows waveforms for explaining the noise-removing effect utilizing the horizontal correlation of the TV signal and the spark-like interference-removing effect of the dropout compensation system according to the present invention. In FIG. 6 at (a) shows the first control signal, at (b) the output waveform of the first demodulator 8, at (c) the output waveform of the second demodulator 9, at (d) the output waveform of the first combining circuit 10, at (e) the second control signal, at (f) the output waveform of the second electronic switch 12, and at (g) the output waveform of the dropout compensation system according to the present invention produced at the output terminal 19. These waveforms in FIG. 6 show an example in which the dropout duration lasts a little longer than one horizontal scanning period of the TV signal. The period during which the signal of (a) is "high" corresponds to the period of the duration of the dropout. As seen from (b), spark-like interferences occur at time points substantially the delay time of the first demodulator delayed respectively from the occurrence and the end of the dropout and at a time point later than the dropout occurrence by one horizontal scanning period (1H) plus the delay time of the first demodulator. The spark-like interferences in (c) are delayed by one horizontal scanning period from those in (b) respectively. As a result, as seen from (d), the spark-like interferences in the beginning and end of the dropout are produced at the output of the first combining circuit 10. In order to take out these spark-like interferences, the second control signal is generated for a period $\Delta\tau$ a little longer than the delay time of the first demodulator 8 from the instant of each change of the first control signal as shown in (e). During a period T between the fall and rise of two successive second control signals in (e), since no output is produced as shown in (d), the same result will be obtained regardless of whether a control signal is generated or not during this period T. A simpler one of the circuit configurations may be thus selected. The waveform of (f) shows that the limiter operates during the period when the dropout does not occur. On the other hand, in (g) it is shown that the noise-removing function is effective during the period when the dropout does not occur, and the noise-removing function is not effective during the period of occurrence of the dropout and the following one horizontal scanning period, with the spark-like interference alone being removed in the beginning and end of the dropout.

It will be understood from the foregoing description that according to the present invention, the dropout compensating system is realized in which the spark-like interference in the beginning and end of the dropout are prevented. The first advantage of the present invention is the very easy adjustment of the circuits. Especially, in view of the fact that signals are switched between a difference signal between two demodulated TV signals containing substantially no DC components and no-signal or an amplitude-limited signal, variations of DC level caused upon switching of the signals are controllable within a practical range even in the case where the electronic switch is comprised of integrated circuits, thus eliminating the requirement of adjustment. According to the present invention, the spark-like interference is removed only in the beginning and end of the dropout, so that if the dropout least for longer than one horizontal scanning period, the spark-like interference remains unremoved for each horizontal scanning period from the time of generation of the dropout. Nevertheless, the probability of occurrence of the dropout lasting for longer than one horizontal scanning period is less than 10% in the case of the domestic magnetic video recording-reproducing apparatus currently used, and therefore it has been confirmed experimentally that substantially all spark-like interferences can be removed.

The second advantage of the present invention is that when applied to magnetic video recording and reproducing apparatus and video disc apparatus, the TV image quality can be improved easily including the removal of signals leaked from adjacent tracks and removal of cross modulation components with the chrominance signal from the luminance signal in the color magnetic video recording-reproducing apparatus. This function is already used generally in the domestic magnetic video recording-reproducing apparatus independently, and requires a number of circuits resulting in a high production cost. The present invention takes advantage of the commonly required characteristics for the spark-like interference removing circuit and the noise-removing circuit, so that a common circuit is used for noise removal normally, and for removing spark-like noises in the presence of a dropout. According to the present invention, as compared with the provision of these circuits separately, only a simple circuit addition achieves both functions with a slight cost increase. Thus the cost of each function is reduced substantially to half, thereby making possible effective use of the circuits.

We claim:
1. A dropout compensation system comprising:
   input means for receiving a modulated signal subject to dropouts;
   dropout detector means having an input connected to said input means, an output and a control output, for producing a first control signal in response to the occurrence of a dropout;
   first switch means having an output, a first input connected to said input means, a second input, and a control input connected to the control output of said dropout detector means, said first switch means being controlled by said first control signal such that the modulated signal applied to said first input is normally introduced to the output thereof and when the dropout occurs, the signal of said second input is introduced to said output;
   delay means having an input connected to the output of said first switch means and an output connected to the second input of said first switch means;
   means for demodulating said modulated signal, said demodulating means including a first demodulator having an input connected to the output of said first switch means and an output and including a second demodulator having an input connected to the output of said delay means and an output;
   first combining means having a first input connected to the output of said first demodulator, a second input connected to the output of said second demodulator and an output, for producing a difference signal between first and second input signals;
   means having an input connected to the output of said dropout detector means, and an output, for producing second control signals of a predetermined time length respectively starting from the beginning and end of the dropout detection by said first control signal, or producing a second control signal having a maximum time length starting from the generation of said first control signal until a predetermined time elapses after the end of dropout detection;
   second switch means having at least an input, an output and a control input supplied with the second control signal, for switching the passage and cutoff of the input signal applied to the input terminal thereof in response to the second control signal without substantially changing the DC voltage at the output thereof;
   coupling means for coupling the output of said first combining means and the input terminal of said second switch means; and
   second combining means having a first input connected to the output of said first demodulator, a second input connected to the output of said second switch means and an output, for combining signals applied to said first and second inputs and producing a dropout-compensated signal.

2. A system according to claim 1, wherein said output of said first combining means and the input of said second switch means are connected to each other by coupling means having a filter at least cutting off a DC component and for passing a predetermined band components alone, said second switch means passing the output signal of said filter to the output terminal thereof during the generation of said second control signal and cutting off said output signal of said filter during the period when said second control signal is not produced.

3. A system according to claim 1, wherein said second switch means further includes a second input, the output of said first combining means and the first input of said second switch being connected to each other by first coupling means for passing selected one of a predetermined band width and a whole band width both containing a DC component, the output of said first combining means and the second input of said second switch means being connected to each other by second coupling means having a filter for substantially passing only the DC component so that the signal applied to said first input of said second switch means is passed to the output thereof during the period when said second control signal is generated.

4. A system according to claim 1, wherein said second switch means further includes a second input, the output of said first combining means and the first input of said second switch means being connected to each other by first coupling means having a first filter for cutting off at least a DC component and passing only a predetermined band component, the output of said first combining means and the second input of said second switch means being connected to each other by second coupling means having limiter means for limiting the amplitude of the output of said first combining circuit and a filter for cutting off at least a DC component and passing only predetermined band components, the signal applied to said first input of said second switch means being passed to the output of said second switch means during the period when said second control signal is generated, the signal applied to said second input of said second switch means being passed to said output during the period when said second control signal is not generated.

5. A system according to claim 1, wherein said second switch means further includes a second input, the output of said first combining means and the first input of said second switch means being connected to each other by first coupling means for passing signals of selected one of the whole band width and a predetermined band width, the second input of said second switch means being connected to selected one of the input, the output and the junction therebetween of said first coupling means by second coupling means including limiter means for limiting the amplitude of the output signal of said first combining circuit, said second coupling applying an average potential substantially equal to the average voltage of said first input of said second switch means to said second input thereof, the signal applied to said first input of said second switch means being passed to the output thereof during the period when said second control signal is generated, the signal applied to said second input of said second switch means being passed to the output thereof during the period when said second control signal is not generated.

6. A system according to claim 1, wherein said modulated signal is modulated by a video signal, and said delay means has a delay time equal to one line period of said video signal.

7. A system according to claim 1, wherein said predetermined time for said means for generating the second control signal is longer than the delay time of said demodulator means.

* * * * *